United States Patent
Zhi et al.

(10) Patent No.: US 11,407,641 B2
(45) Date of Patent: Aug. 9, 2022

(54) METHOD OF PREPARING GRAPHDIYNE-BASED MATERIAL AND A SUBSTRATE FOR USE IN SUCH MATERIAL PREPARATION PROCESS

(71) Applicant: City University of Hong Kong, Kowloon (HK)

(72) Inventors: Chunyi Zhi, New Territories (HK); Qi Yang, Kowloon (HK); Ying Guo, Kowloon (HK); Zijie Tang, New Territories (HK)

(73) Assignee: City University of Hong Kong, Kowloon (HK)

( * ) Notice: Subject to any disclaimer, the term of this patent is extended or adjusted under 35 U.S.C. 154(b) by 233 days.

(21) Appl. No.: 16/895,170

(22) Filed: Jun. 8, 2020

(65) Prior Publication Data

US 2021/0380411 A1    Dec. 9, 2021

(51) Int. Cl.
*C01B 32/05*   (2017.01)
*B01J 21/18*   (2006.01)

(52) U.S. Cl.
CPC ............ *C01B 32/05* (2017.08); *B01J 21/18* (2013.01); *C01P 2002/20* (2013.01)

(58) Field of Classification Search
CPC ......... C01B 32/05; C01B 32/15; B01J 21/18; B01J 23/06; B01J 23/8953; B01J 27/1856; B01J 2523/00; C01P 2002/20
See application file for complete search history.

(56) References Cited

U.S. PATENT DOCUMENTS

| 2019/0144282 A1 | 5/2019 | Li et al. |
| 2019/0228978 A1 | 7/2019 | Toriumi et al. |

OTHER PUBLICATIONS

Gao, et al., Graphdiyne: synthesis, properties, and applications, Chem. Soc. Rev. 2019; 48: 908-936 (Year: 2019).*
Li, G., et al., "Architecture of Graphdiyne Nanoscale Films" Chemical Communication, 2010, 46, 3256-3258.
Zuo, Z., et al., "Emerging Electrochemical Energy Applications of Graphdiyne" Joul, 2019, 3, 899-903.
He, J., et al., "Hydrogen Substituted Graphdiyne as Carbon-Rich Flexible Electrode for Lithium and Sodium Ion Batteries" Nature communications, 2017, 8, 1172.

* cited by examiner

*Primary Examiner* — Daniel C. McCracken
(74) *Attorney, Agent, or Firm* — Renner Kenner Greive Bobak Taylor & Weber

(57) ABSTRACT

A method of preparing graphdiyne-based material and a substrate for use in such material preparation process. The method includes the steps of: disposing an alkynye-based monomer on a substrate; maintaining a planar structure of each of a plurality of molecules of the monomer on a surface of the substrate; and initiating polymerization of the monomer on the substrate to synthesize a two-dimensional crystalline layer of the graphdiyne-based material on the substrate.

12 Claims, 20 Drawing Sheets

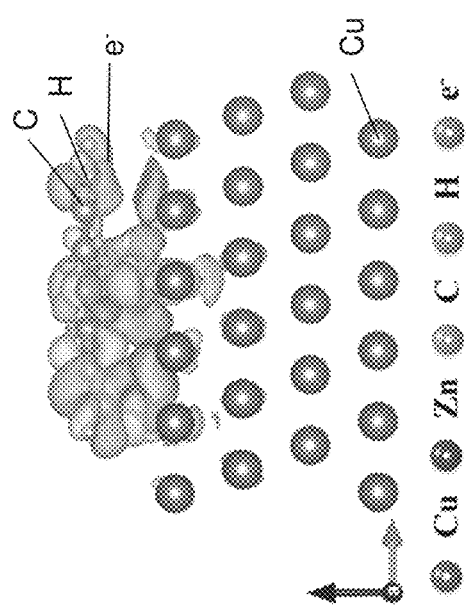
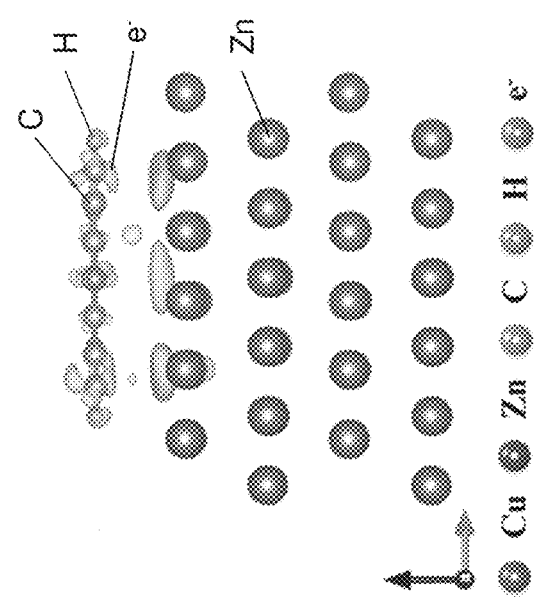
Fig. 4A
Fig. 4B

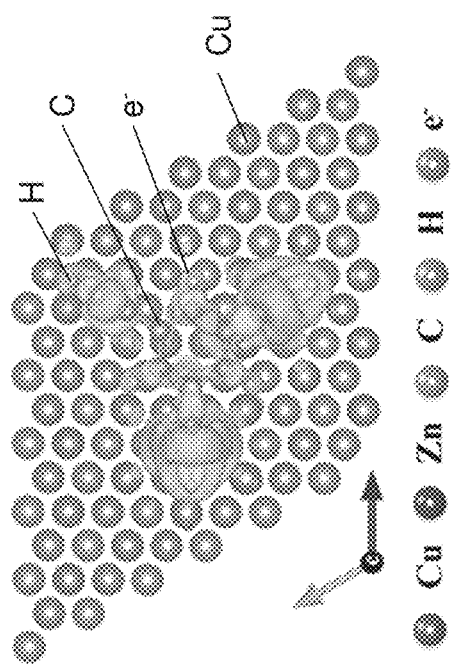 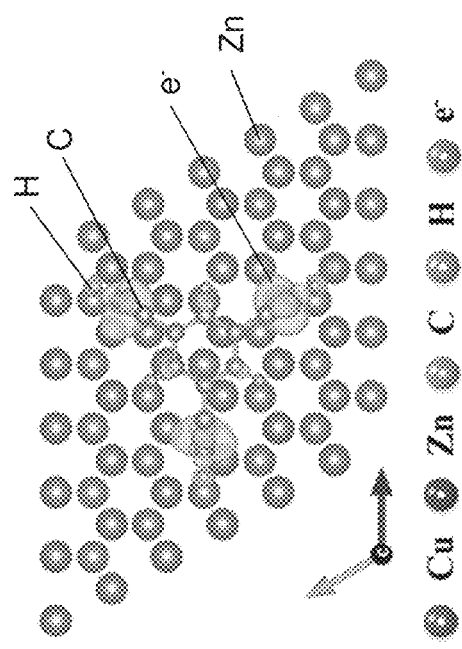
Fig. 4C
Fig. 4D

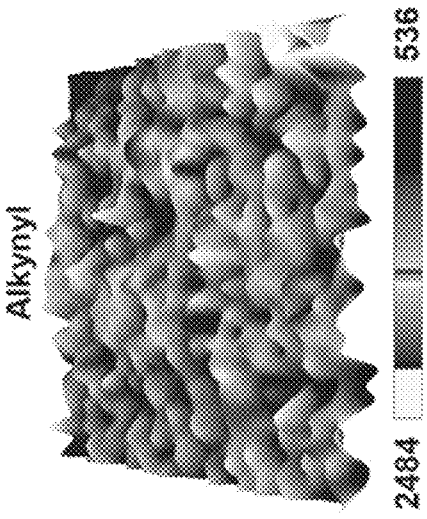
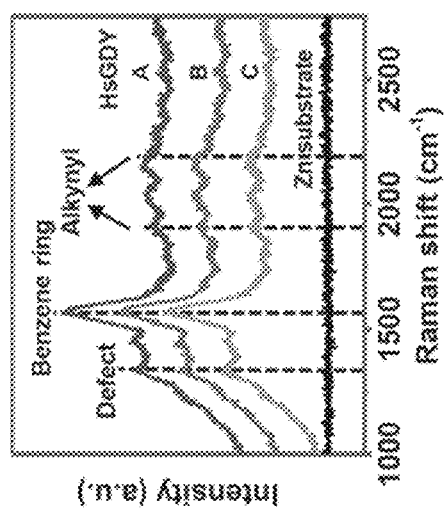
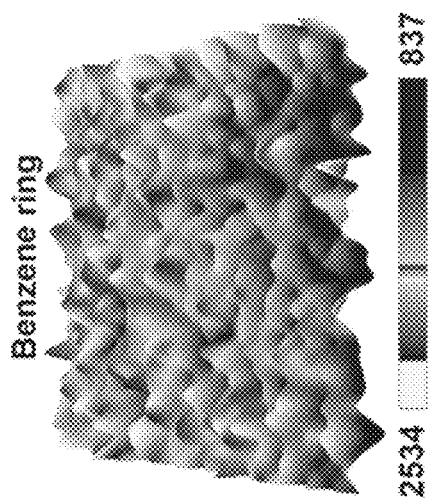
Fig. 9A
Fig. 9B
Fig. 9C

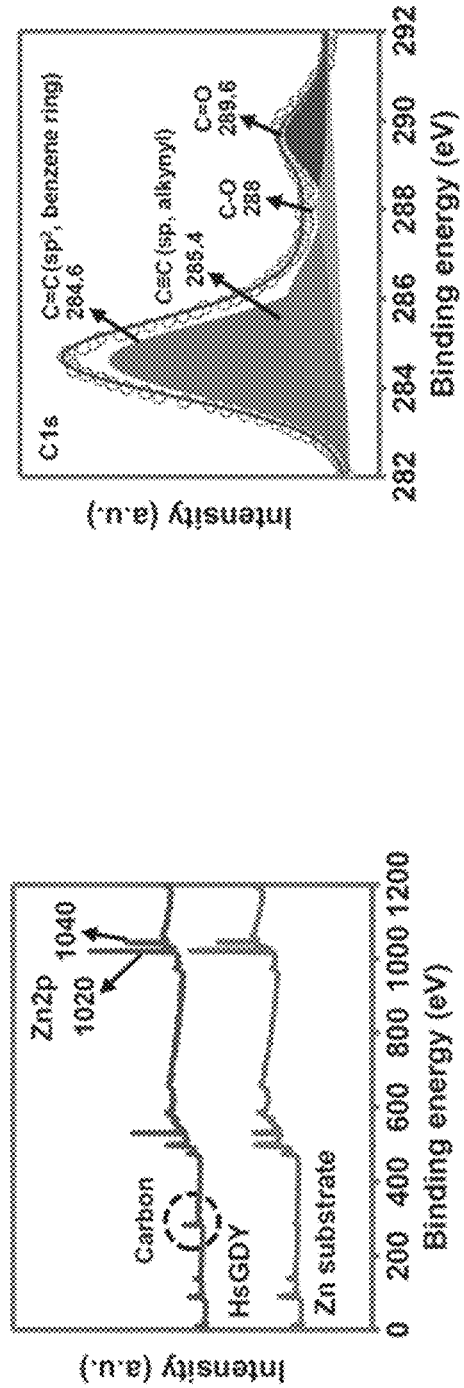
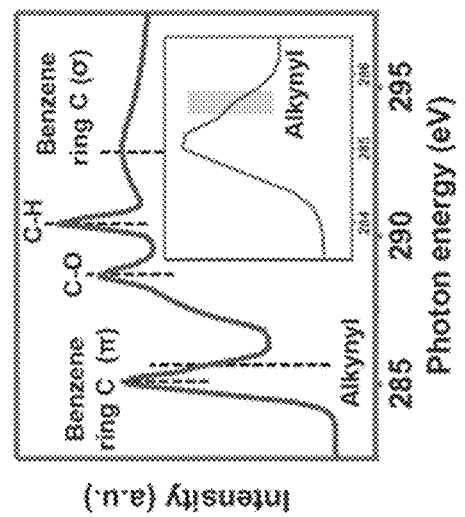
Fig. 11A
Fig. 11B
Fig. 11C

METHOD OF PREPARING GRAPHDIYNE-BASED MATERIAL AND A SUBSTRATE FOR USE IN SUCH MATERIAL PREPARATION PROCESS

TECHNICAL FIELD

The present invention relates to a method of preparing a graphdiyne-based material, in particular, but not exclusively, to a method of synthesizing crystalline graphdiyne-based material. The present invention also relates to a substrate for preparing graphdiyne-based material, a graphdiyne-based material prepared by such a method, and a catalyst including the material for use in nitrogen fixation.

BACKGROUND

Carbon materials offer exceptional chemical-physical, electrical, mechanical and even optical properties, which have exhibited a vital role in current material-related advances. For example, fullerenes, carbon nanotubes (CNTs), and graphene have been applied in different applications such as catalysis, battery chemistry, biomedicine, purification and the like.

The functions/properties of the carbon materials are generally governed by the structure of the materials, which is in turn related to the synthesis of the materials. In other words, different methods of preparing the material could lead to different carbon material structures and may therefore significantly affect the performance of the material in a particular application.

SUMMARY OF THE INVENTION

In accordance with the first aspect of the present invention, there is provided a method of preparing a graphdiyne-based material comprising the steps of disposing an alkynye-based monomer on a substrate; maintaining a planar structure of each of a plurality of molecules of the monomer on a surface of the substrate; and initiating polymerization of the monomer on the substrate to synthesize a two-dimensional crystalline layer of the graphdiyne-based material on the substrate.

In an embodiment of the first aspect, the substrate is arranged to reduce chemisorption between each of the plurality of molecules of the monomer and the surface of the substrate.

In an embodiment of the first aspect, the reduction of chemisorption causes an increase in monomer-substrate distance, thereby preventing configuration distortion of each of the plurality of molecules of the monomer.

In an embodiment of the first aspect, the alkynye-based monomer comprises a structure of Formula (I):

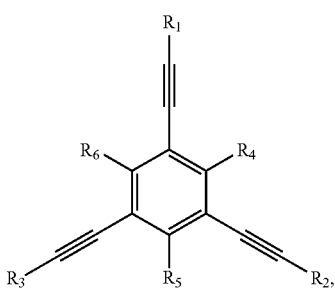

Formula (I)

wherein $R_1$-$R_6$ are independently selected from hydrogen, a trimethylsilyl group, or a halogen.

In an embodiment of the first aspect, the alkynye-based monomer includes the structure of Formula (I), and wherein $R_1$-$R_3$ are identical and being H, $SiMe_3$, Cl, Br, or I; and wherein $R_4$-$R_6$ are identical and being H, C≡$CSiMe_3$, Cl, Br, or I.

In an embodiment of the first aspect, the alkynye-based monomer includes the structure of Formula (I), and wherein $R_1$-$R_6$ are identical and being H.

In an embodiment of the first aspect, the method further comprises the step of disposing a polymerization catalyst on the substrate, prior to the step of disposing the alkynye-based monomer on the substrate.

In an embodiment of the first aspect, the step of disposing a polymerization catalyst includes the step of dissolving the polymerization catalyst in a solvent mixture.

In an embodiment of the first aspect, the polymerization catalyst includes $PdCl_2(PPh_3)_2$ and CuI.

In an embodiment of the first aspect, the solvent mixture includes tetrahydrofuran and trimethylamine at a volume ratio of 1:1.

In an embodiment of the first aspect, the substrate is a zinc-based material.

In an embodiment of the first aspect, the zinc-based material includes zinc plate and zinc powder.

In accordance with the second aspect of the present invention, there is provided a substrate for preparing a graphdiyne-based material, comprising a zinc-based material for polymerization of an alkynye-based monomer occurred thereon; wherein the zinc-based material is arranged to maintain a planar structure of each of a plurality of molecules of the monomer disposed on a surface of the substrate, such that upon polymerization of the monomer, a two-dimensional crystalline layer of the graphdiyne-based material is synthesized on the substrate.

In an embodiment of the second aspect, the zinc-based material includes zinc plate and zinc powder.

In an embodiment of the second aspect, the zinc plate has a thickness of 30-200 μm.

In an embodiment of the second aspect, the zinc powder has a diameter of 0.5-5 μm.

In an embodiment of the second aspect, the alkynye-based monomer comprises a structure of Formula (I):

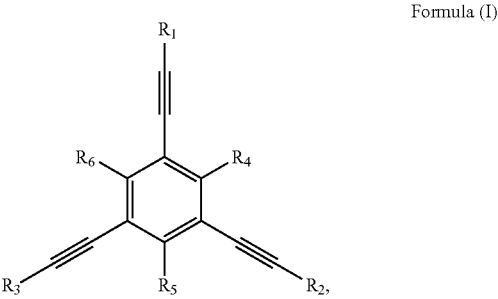

Formula (I)

wherein $R_1$-$R_6$ are independently selected from hydrogen, a trimethylsilyl group, or a halogen.

In accordance with the third aspect of the present invention, there is provided a graphdiyne-based material, comprising at least one two-dimensional crystalline layer of graphdiyne-based material synthesized on a zinc-based substrate.

In an embodiment of the third aspect, adjacent layers of the at least one two-dimensional crystalline layer includes a bilayer structure of graphdiyne-based material.

In an embodiment of the third aspect, the bilayer structure includes adjacent layers being spaced apart by an interlayer spacing of about 0.361 nm.

In an embodiment of the third aspect, each of the two-dimensional crystalline layers includes a hydrogen-substituted graphdiyne nanosheet with a height of about 0.68-0.75 nm.

In accordance with the forth aspect of the present invention, there is provided a catalyst for use in nitrogen fixation, comprising a graphdiyne-based material according to the third aspect of the present invention.

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 4A is a schematic diagram showing deformation charge density of TEB-Cu system, demonstrating the vertical charge transfer between TEB and the copper substrate.

FIG. 4B is a schematic diagram showing deformation charge density of TEB-Zn system, demonstrating the vertical charge transfer between TEB and the zinc substrate.

FIG. 4C is a schematic diagram showing deformation charge density at a transverse direction revealing the interaction sites of TEB on the copper substrate.

FIG. 4D is a schematic diagram showing deformation charge density at a transverse direction revealing the interaction sites of TEB on the zinc substrate.

FIG. 9A is a Raman spectra of the HsGDY of FIG. 8.

FIG. 9B is Raman mapping of the HsGDY of FIG. 8 focusing on the Raman shifts of alkynyl groups.

FIG. 9C is Raman mapping of the HsGDY of FIG. 8 focusing on the Raman shifts of benzene rings.

FIG. 11A is an X-ray photoelectron spectroscopy (XPS) showing the data survey of the HsGDY of FIG. 8.

FIG. 11B is a high resolution C1s spectra of the HsGDY of FIG. 8.

FIG. 11C is a spectra of C K-edge X-ray absorption near edge spectroscopy (XANES) of the HsGDY of FIG. 8 showing the chemical environment of C atoms. The insert shows the magnified peak of the alkynyl groups.

DETAILED DESCRIPTION OF THE PREFERRED EMBODIMENTS

The inventors have, through their own research, trials and experiments, devised that graphyne is an allotrope of carbon.

In general, graphyne is composed of benzene rings connected by acetylene bonds. In particular, graphyne can be divided into different types based on the arrangement combinations between the benzene rings and the acetylene bonds. For example, one type of graphyne may be defined by changing the number of acetylene bonds between two adjacent benzene rings; whereas another type of graphyne may be defined by the number of carbon atoms in the central ring, while preserving the number of acetylene bonds between adjacent benzene rings.

One example of graphyne is graphdiyne (GDY), which includes two acetylene groups connecting two adjacent benzene rings. In particular, theoretical calculations indicated that GDY includes $sp^2$ and $sp$ carbon atoms, which endow GDY a highly conjugated system (high $\pi$-conjugation) that may render GDY excellent structural and chemical stability. In addition, such highly conjugated system may account for the potential use of GDY in electrochemical energy storage applications and catalysis.

Without wishing to be bound by theory, the characteristics/properties of the GDY may be correlated to the structure of the GDY, which may be governed by the method of preparing the same. However, the inventors devised that many of the reported GDYs may either possess a porous network/particle morphology (i.e. non two-dimensional (2D)) or an amorphous crystalline structure, which deviate from the theoretical prediction (an ordered 2D structure). Besides, those reported reactions may suffer from a low synthetic yield as well.

The inventors devised that these issues may be correlated to spatially unordered cross-coupling reaction between adjacent alkyne-based monomers, which may originate from excessive interaction between the monomers and a substrate for the reaction.

Figure 1:
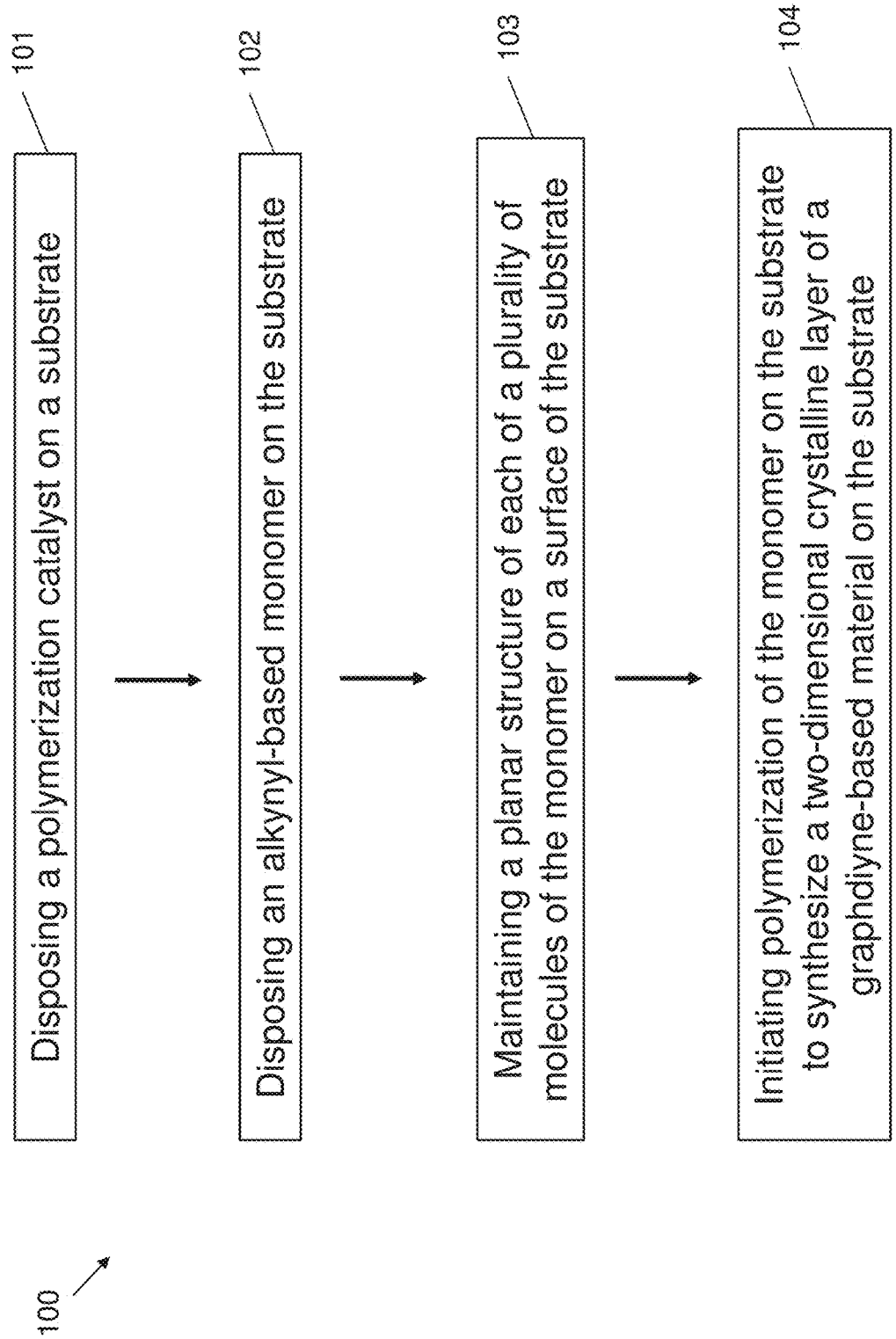
FIG. 1 is a flowchart illustrating a process flow of a method in accordance with an embodiment of the present invention.

With reference to FIG. 1, there is provided a method 100 of preparing a graphdiyne-based material. The method comprises the steps of disposing an alkyne-based monomer on a substrate; maintaining a planar structure of each of a plurality of molecules of the monomer on a surface of the substrate; and initiating polymerization of the monomer on the substrate. Preferably, with the use of method 100, a two-dimensional (2D) crystalline layer of the graphdiyne-based material may be synthesized on the substrate.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments.

However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

Referring to FIG. 1, the preparation method 100 begins at step 101 which includes the step of disposing a polymerization catalyst on a substrate. The polymerization catalyst may be any chemical compounds that can facilitate a coupling reaction between two or more alkynyl groups of a plurality of adjacent molecules of an alkyne-based monomer. That is, the polymerization catalyst may be any chemical compounds that can render such coupling reaction feasible and/or enhance the reaction rate thereof. In particular, the polymerization catalyst may be a metallic compound with electron configuration valence, and therefore being capable of forming a complex with the molecules of the monomer during polymerization.

Preferably, the polymerization catalyst may be at least one of a copper-based, palladium-based, nickel-based, iron-based, or ruthenium-based catalyst. More preferably, the polymerization catalyst may be a copper-based and/or palladium-based catalyst(s).

At step 101, one or more of the polymerization catalyst(s) in a suitable physical form may be disposed on the substrate. For example, the catalyst may be disposed on the substrate in a solid, liquid, or gaseous form. Preferably, the catalyst may be in a liquid catalyst being disposed on the substrate. The liquid catalyst may be obtained by dissolving solid polymerization catalyst(s) in a solvent mixture of a particular volume ratio. Optionally or additionally, ultrasonic treatment or electromagnetic stirring may be used to facilitate the dissolution of the solid polymerization catalyst during the dissolution process.

In one example, the polymerization catalyst may comprise a solution containing $PdCl_2(PPh_3)_2$ and $CuI$. Such solution may be prepared by dissolving solid $PdCl_2(PPh_3)_2$ and $CuI$ in a solvent mixture. The solvent mixture may include tetrahydrofuran (THF) and trimethylamine (TMA). Preferably, 50-100 µg/mL of PdCl$_2$(PPh$_3$)$_2$ and 5-50 µg/mL of CuI may be dissolved in a solvent mixture of THF/TMA with a volume ratio of 1:1. The solid PdCl$_2$(PPh$_3$)$_2$ and CuI may be dissolved simultaneously in the THF/TMA mixture. Alternatively, each of the solids PdCl$_2$(PPh$_3$)$_2$ and CuI may be dissolved in separate THF/TMA mixture and then mixed together upon being applied onto the substrate. Optionally or additionally, the solids may be dissolved with an aid of ultrasonic treatment or electromagnetic stirring for 10-30 minutes. The liquid catalyst may be disposed on the substrate by methods known in the art such as spin coating or simply repeatedly immersing the substrate into the catalyst solution so as to obtain a layer of liquid catalyst on the substrate.

Optionally or additionally, the substrate may be cleaned with suitable solvent(s) prior to disposing the polymerization catalyst thereon so as to remove any materials on the substrate surface that could poison the catalyst (i.e. deactivating the catalyst). For example, the substrate may be cleaned with ethanol and allowed to dry at room temperature or at an elevated temperature prior to initiating step 101.

After disposing the polymerization catalyst on the substrate, the method may proceed to step 102. In this step, an alkyne-based monomer is disposed on the substrate. The alkyne-based monomer may be a carbocyclic compound with at least three acetylene groups arranged thereon. In particular, the carbocyclic compound may have at least three acetylene groups, each arranged on the carbocyclic ring of the compound.

Preferably, each of the acetylene groups is capable of cross-coupling with the acetylene group of another alkyne-based monomer, thereby forming a network of such monomer linked by the acetylene groups. In one example, the alkyne-based monomer may comprise a structure of Formula (I):

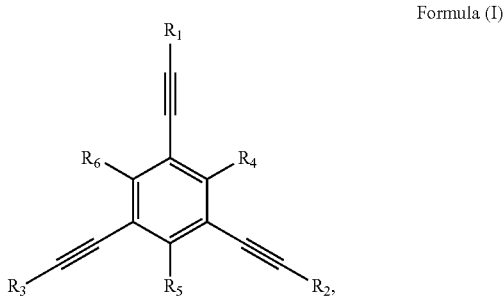

Formula (I)

wherein $R_1$-$R_6$ are independently selected from hydrogen, a trimethylsilyl group, or a halogen.

Preferably, $R_1$-$R_3$ may be identical and being H, SiMe$_3$, Cl, Br, or I, and $R_4$-$R_6$ may be identical and being H, C≡CSiMe$_3$, Cl, Br, or I.

Preferably, the alkyne-based monomer with a structure of Formula (I) may be a hydrogen-substituted monomer. For example, $R_4$-$R_6$ may be identical and being H whereas $R_1$-$R_3$ may be identical and being H, SiMe$_3$, Cl, Br, or I. More preferably, $R_1$-$R_6$ may be identical and being H. That is, the alkyne-based monomer may be 1, 3, 5-triethynylbenzene (TEB).

The alkyne-based monomer may be disposed on the substrate with a suitable physical form such as a solid, liquid or a gaseous form. Preferably, the monomer may be disposed on the substrate in a solid form. That is, solid monomer may be disposed into a layer of liquid catalyst that is disposed on the substrate. In one example, the alkyne-based monomer, such as TEB solid, may be disposed on the substrate with a mass of 5-30 mg.

The method 100 may now move to step 103, which comprises the step of maintaining a planar structure of each of a plurality of molecules of the alkyne-based monomer on a surface of the substrate. Advantageously, high quality GDY material with substantial 2D structure may be prepared by maintaining the monomers planar during the subsequent polymerization process, and the mechanism is further explained as follows.

After the monomer being disposed on the substrate, molecules of the monomer may adsorb onto the surface of the substrate for chemical reaction. i.e. there may be chemisorption between each of the molecules of the monomer and the surface of the substrate after the disposal; and this would be essential and unavoidable for the polymerization (i.e. cross-coupling reaction) of the monomer to occur. Moreover, the strength of such chemisorption may substantially affect the structure and/or morphology of the final product (i.e. the graphdiyne-based material).

Figure 2A:
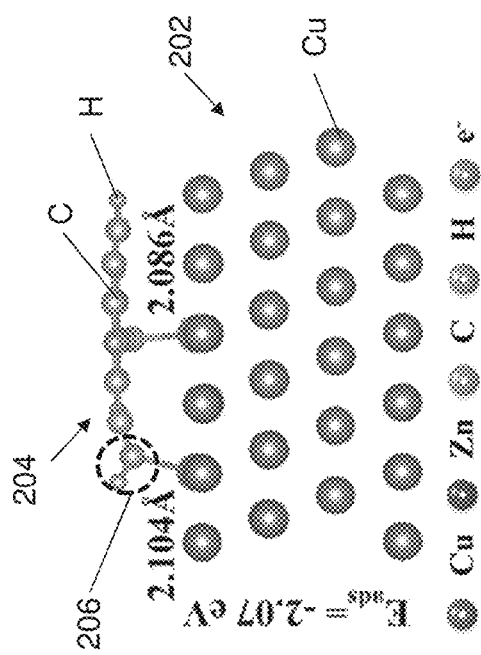
FIG. 2A is a schematic diagram showing the optimized structure of the chemisorption of a molecule of 1, 3, 5-triethynylbenzene (TEB) on a surface of a copper substrate.

With reference also to FIG. 2A, there is provided a schematic diagram showing the chemisorption of a molecule of an alkyne-based monomer on a surface of a substrate. As shown, after being disposed on the substrate 202, the monomer molecule 204 approaches to the surface of the substrate 202 and interacts therewith (such as forming an electrostatic interaction therebetween), thereby the monomer molecule is chemisorbed on the substrate surface. With such interaction, electrons may be transferred readily among adjacent monomer molecules, catalyst(s) as well as the substrate, and therefore allowing the polymerization to occur.

The strength of such electrostatic interaction may be correlated to the electron configuration of the atoms of the substrate. For example, referring to FIG. 2A, the substrate 202 may be a copper substrate such as a copper foil. It is appreciated that copper atom possesses only one electron at its outermost 4s orbital and therefore the copper atom may substantially act as an electrophile (i.e. more readily to attract/accept external electron(s)) to fill up the 4 s orbital.

Such behaviour may therefore lead to an increase in chemisorption between the monomer molecule and the substrate surface, which pulls the monomer molecule closer toward the surface of the substrate as shown in FIG. 2A. In other words, the monomer-substrate distance is reduced as a result of such increased chemisorption.

In addition, as most of the electron density of the monomer molecule may be concentrated at the π bond of the alkynyl groups (i.e. the π electrons may be concentrated on the alkynyl groups), the chemisorption at those regions (such as region 206) with the substrate may be even stronger, which eventually lead to a configuration distortion, particularly a longitudinal distortion of the alkynyl groups of the monomer molecule. As such, each of the monomer molecules is no longer coplanar with the surface of the substrate and/or being coplanar with respect to each other. Thus, alkynyl linkages formed between each of the monomer molecules during the polymerization may not be on the same plane, leading to an unordered/amorphous structure of the graphdiyne-based material as a consequence.

In view of the above, the inventors have devised that by reducing the chemisorption between the monomer molecule(s) and the surface of the substrate, the aforesaid configuration distortion may be prevented, which may consequently obtaining a two-dimensional crystalline layer of the graphdiyne-based material.

Figure 2B:
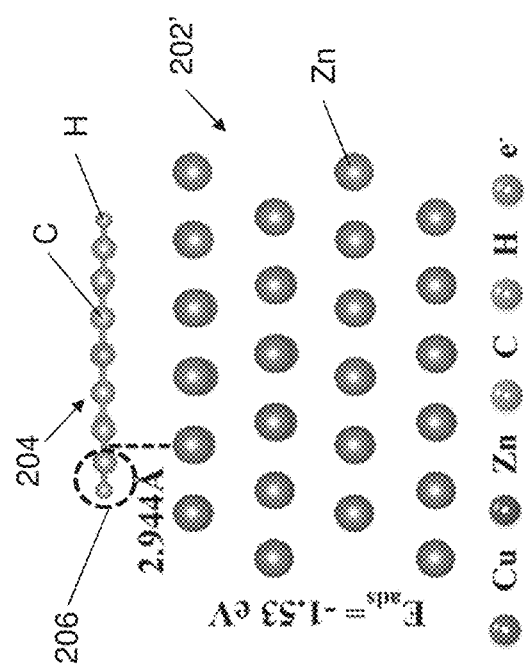
FIG. 2B is a schematic diagram showing the optimized structure of the chemisorption of a molecule of TEB on a surface of a zinc substrate.

With reference to FIG. 2B, there is provided a schematic diagram showing the chemisorption of a molecule of an alkyne-based monomer on a surface of a substrate with reduced chemisorption according to one example embodiment of the present invention. In particular, the substrate may include a metallic element with its outermost 4s orbital being filled with a lone pair electron (i.e. two electrons). In one preferred embodiment, the substrate 202' may include zinc. That is, the substrate 202' may be a zinc-based material.

It is appreciated that the zinc atom of the zinc-based substrate 202' possesses an electron configuration of a fully filled 4s orbital (i.e. with the 4s orbital being filled with two electrons). With such electron configuration, in contrast to the above discussion regarding to FIG. 2A, the zinc atoms of the substrate 202' may less substantially act as an electrophile since the 4s orbital has already been filled up. Thus, the chemisorption between the monomer molecule 204 and the surface of the substrate 202' may be much reduced. As a result, the monomer molecule is further away from the surface of the substrate as shown in FIG. 2B.

In addition, the high saturability of the 4s orbital may also render the chemisorption between the alkynyl groups and the substrate surface weaker (as compared with the case in FIG. 2A), which therefore preventing the alkynyl groups (206) from being (longitudinally) distorted toward the substrate surface. In other words, each of the monomer molecules is maintained to be coplanar with the substrate surface as well as being coplanar with each other. Thus, alkynyl linkages formed between each of the monomer molecules during the polymerization may be on the same plane, leading to a highly ordered layer of the graphdiyne-based material, particularly a two-dimensional crystalline layer of the graphdiyne-based material as a consequence.

The zinc-based substrate may be implemented as any suitable form such as a foil, powder, plate, ribbon and the like. In one example, the zinc-based substrate may be implemented as a zinc plate. The zinc plate may have a thickness of 30-200 µm. It is appreciated that the thickness of the substrate may be adjusted according to one's need. In another example, the zinc-based substrate may be implemented as zinc powders. The zinc powders may have a diameter of 0.5-5 µm. It is appreciated that the diameters of the powders may be adjusted according to one's need.

Advantageously, the zinc powders may provide a larger surface area by which more monomer molecules may be chemisorbed thereon in one synthetic cycle, which may lead to an increased production yield of the graphdiyne-based material. In one example embodiment, the inventors have devised that at least 0.5 g of the graphdiyne-based material may be obtained with the use of the zinc powders. In addition, the inventors have, through their research, trials, and experiments, devised that the zinc powders may participate in the polymerization process. In particular, the metallic zinc from the zinc powder may be etched away to become zinc ion to catalyze the polymerization process, and may be electrochemically reduced back to the metallic zinc for next synthetic cycle. This may be advantageous as the recycling of the zinc (powder) substrate may prolong the operation lifetime thereof, enhancing the sustainability of the synthetic system of the present invention.

Referring back to FIG. 1, the preparation method 100 ends at step 104. In this step, the polymerization of the monomer on the substrate may be initiated to synthesize a two-dimensional crystalline layer of the graphdiyne-based material on the substrate. In particular, the polymerization reaction may be carried out at a constant temperature of 30-80° C. for 1-24 hours. For example, the substrate with the polymerization catalyst as well as the monomer thereon may be put in a container, with the temperature of the container being kept constant with a water bath to carry out the polymerization reaction. Finally, the as-synthesized graphdiyne-based material may be rinsed with suitable solvent such as ethanol for several times (e.g. 5 times) to remove any residuals left on the surface of the material.

Figure 3:
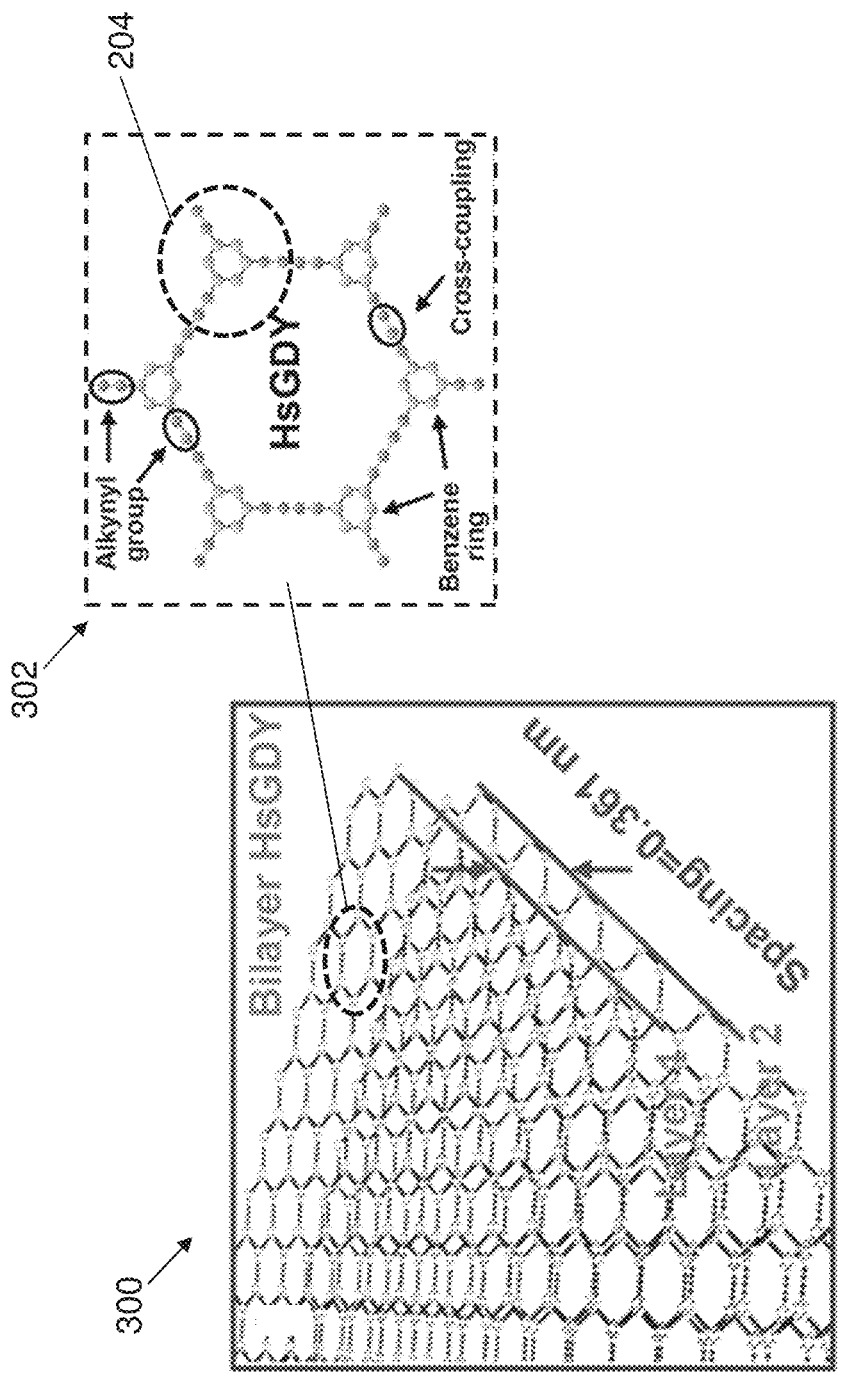
FIG. 3 is a schematic diagram showing a bilayer structure of a hydrogen-substituted graphdiyne (HsGDY) in accordance with an embodiment of the present invention. The enlarged region illustrates a building unit of the HsGDY.

As mentioned, the graphdiyne-based material prepared by the method of the present invention (such as method 100) may have a two-dimensional (2D) crystalline layer structure. In particular, the graphdiyne-based material may have at least one 2D crystalline layer of the graphdiyne-based material. With reference to FIG. 3, there is provided a schematic diagram showing the 2D crystalline layer of a graphdiyne-based material prepared by the method in accordance with one example embodiment of the present invention.

In this example, the graphdiyne-based material 300 may comprise two highly ordered layers of the material spaced apart from each other. In particular, one of the two layers may overlay the other to form a bilayer structure. Each layer of the material may comprise a plurality of hexagonal units 302 that are closely joined with each other edge by edge. In each of the hexagonal units, there may be six alkyne-based monomers 204 connecting with each other through the respective alkynyl groups. In particular, all the alkynyl linkages of each layer of the material may be on the same plane, thereby forming a continuous graphdiyne-based sheet-like structure.

In one example, the graphdiyne-based material 300 may be a hydrogen-substituted graphdiyne (HsGDY). The HsGDY 300 may include two 2D crystalline layers of HsGDY forming a bilayer structure with an interlayer spacing of about 0.361 nm. In each HsGDY layer, a plurality of hexagonal units 302 is closely joined with each other edge by edge to act as building unit for the material. In this example, each of the hexagonal units 302 may include six 1, 3, 5-triethynylbenzene (TEB) molecules 204 joined together through their respective acetylene groups, forming a diacetylene linkage between the benzene rings of each of the adjacent TEB molecules. In particular, all the diacetylene linkages of each layer of the HsGDY may be on the same plane, thereby forming a continuous HsGDY sheet. Preferably, the HsGDY sheet may be a nanosheet with a height of about 0.68-0.75 nm.

As mentioned, graphdiyne-based material may be applied in various applications such as in electrochemical energy storage and catalysis. In this disclosure, the graphdiyne-based material that possesses at least one two-dimensional crystalline layer of the graphdiyne-based material may be applied as a metal-free catalyst for use in nitrogen fixation.

In particular, the graphdiyne-based catalyst of the present invention may have a nitrogen reduction reaction (NRR) capability of 103 $\mu g\ h^{-1} mg^{-1}_{cat.}$. Detailed performance of the catalyst will be discussed in the later part of this disclosure.

The detailed examples of the method of preparing the graphdine-based material, the characterization and the catalytic properties of the material will now be discussed.

Density Functional Theory (DFT) calculation was conducted to investigate the spatial distribution state of TEB monomer on zinc substrate and the results were compared with the commonly employed copper substrate. By which, it may determine how the spatial distribution state of TEB monomer affects the crystalline degree of as-synthesized hydrogen-substituted graphdiyne (HsGDY).

After system stabilization, the initially coplanar TEB monomer demonstrated apparently longitudinal deviation of alkynyls from the benzene ring-plane to the Cu substrate as quantified by the alkynyl-substrate distance of 2.086-2.104 Å (FIG. 2A). When substituting Cu with Zn, however, TEB could generally maintain its original coplanar configuration with an alkynyl-substrate distance of 2.944 Å (FIG. 2B).

Such molecular configuration distortion (i.e. remarkable rotation down around the pivot between the alkynyl group and the benzene ring) on Cu substrate may be attributed to the much higher adsorption energy of −2.09 eV for TEB-Cu system than that for TEB-Zn system (−1.48 eV). The differences in molecular configuration of the TBE monomer under the chemisorption on different substrates is thought to influence the morphology and structure of HsGDY during the subsequent cross-coupling reaction.

Deformation charge density was carried out to further investigate the chemisorption of TEB monomer on the two substrates. Apparent charge transfer was determined for the TEB-Cu system as compared with that for the TEB-Zn system, evidencing the stronger chemisorption of TEB on Cu and thus resulting in a serious configuration distortion (FIGS. 4A and 4B). Apparently, the charge transfer between TEB and Cu mainly concentrated on the alkynyl sites, and it was found that such charge transfer was much more intensive than that between TEB and Zn. These results therefore visualized the strong interaction between the Cu 4s electron orbit and the n electrons of the alkynyl group(s), resulting in the molecular configuration distortion and the subsequent disordered cross-coupling (FIGS. 4C and 4D).

The strong adsorption associated with the spatial shift of alkynyl is intrinsically caused by the electrostatic interaction between Cu/Zn 4s orbit and the r electrons of the alkynyl groups. It is appreciated that Cu possesses only one electron at its outermost 4s orbital and thus demonstrates excessive electrophilic capability. In contrast, Zn possesses a lone pair electron (i.e. two electrons) at its 4s orbital and therefore demonstrating much less electrophilic capability. In addition, such electron configuration differences render a dramatic distinction of electronegativity for Cu and Zn (1.9 for Cu, 1.6 for Zn). As a result, the Zn 4s orbit with high saturability exerts weak adsorption on TEB and allows TEB to maintain its coplanar molecular structure, contributing to the formation of crystalline (highly ordered) HsGDY.

Figure 5A:
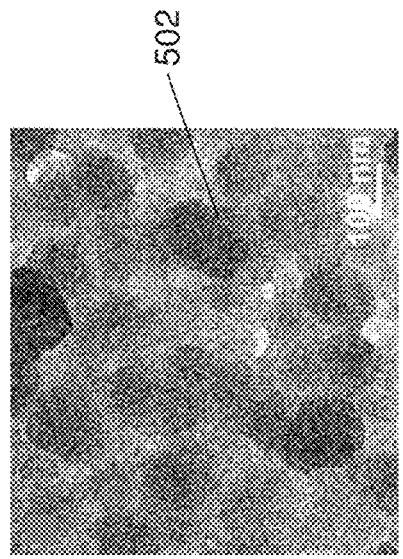
FIG. 5A is a scanning electron microscopy (SEM) image of a HsGDY synthesized on a copper substrate.
Figure 5B:
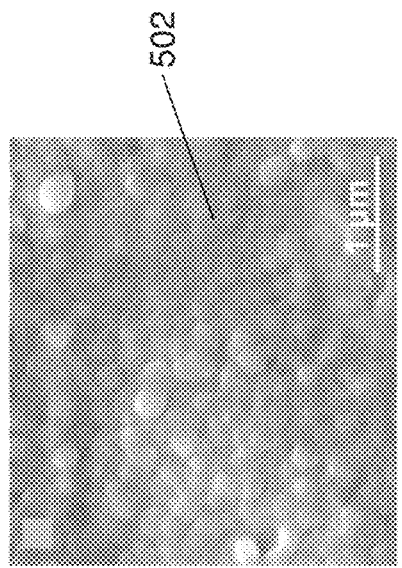
FIG. 5B is a transmission electron microscopy (TEM) image of the HsGDY of FIG. 5A.
Figure 5C:
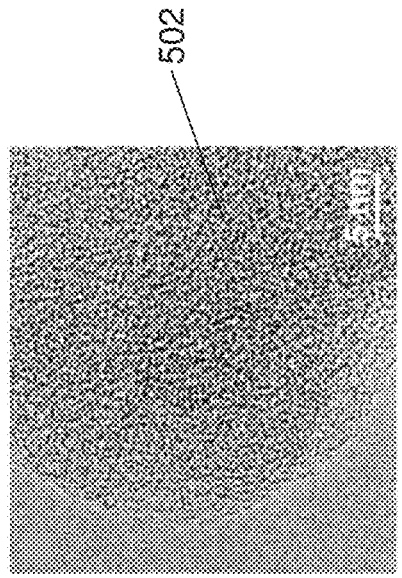
FIG. 5C is a high resolution transmission electron microscopy (HRTEM) image of the HsGDY of FIG. 5A.

The morphology of the HsGDY formed on the Cu substrate as well as on the Zn substrate was investigated by scanning electron microscopy (SEM). As shown in FIG. 5A, the HsGDY formed on Cu substrate (502) consists of enormous particles with quasi-nanoscale diameter. Transmission electron microscopy (TEM) image confirms the particle morphology and highlighted the apparent nanogaps between adjacent particles (FIG. 5B). Further analysis by high resolution TEM (HRTEM) revealed that the HsGDY prepared by the use of Cu substrate was amorphous (FIG. 5C). These results (particle morphology and low crystallinity) are consistent with the theoretical prediction in relation to the monomer configuration distortion on Cu substrate as discussed above.

Figure 6B:
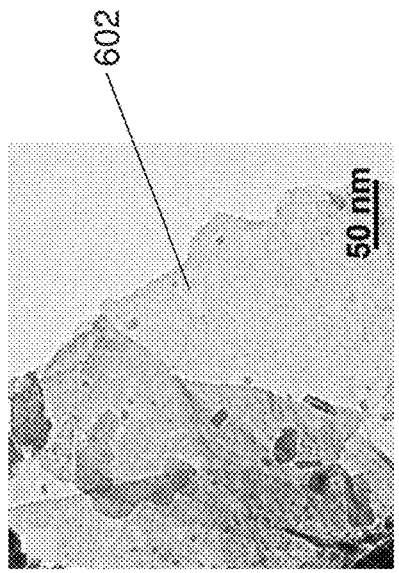
FIG. 6B is a TEM image of the HsGDY of FIG. 6A.
Figure 6A:
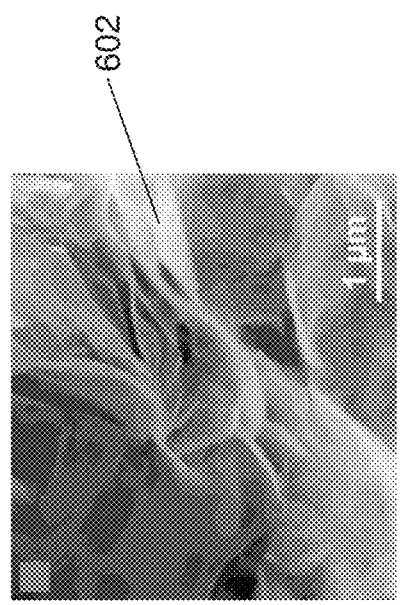
FIG. 6A is a SEM image of a HsGDY synthesized on a zinc substrate.
Figure 6C:
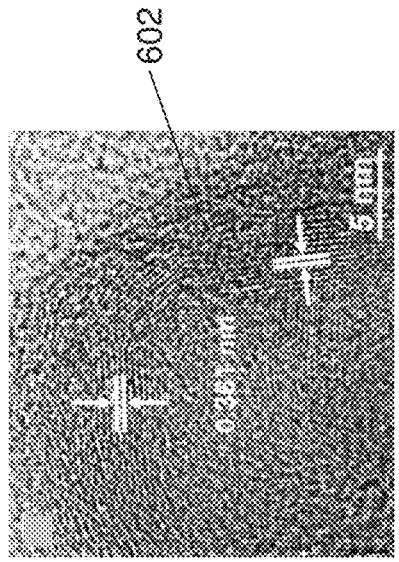
FIG. 6C is a HRTEM image of the HsGDY of FIG. 6A.

When Cu substrate was substituted with Zn substrate, the morphology and the crystalline structure of the as-synthesized HsGDY were found to be totally different. SEM image revealed that the HsGDY synthesized on the Zn substrate (602) possesses a nanosheet morphology and a micronslevel lateral size (FIG. 6A). This may be the first demonstration of 2D crystalline HsGDY nanosheet consistent with the prediction by theoretical simulation based on the coplanar cross-coupling. These HsGDY nanosheets were observed to be semitransparent in the TEM image, further verifying the nanosheet morphology and the ultrathin thickness of the HsGDY 602 (FIG. 6B). In addition, it may be the first time successfully to determine the clear lattice diffraction fringe with an interlayer spacing of 0.361 nm for the HsGDY from the HRTEM image (FIG. 6C), suggesting the high crystallinity of the HsGDY prepared on Zn substrate as compared with those prepared on Cu substrate or any other reported methods.

Figure 7A:
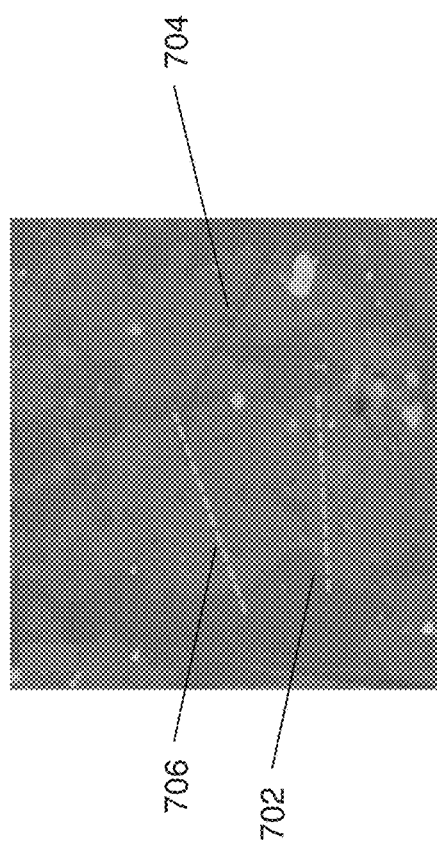
FIG. 7A is an atomic force microscope (AFM) image of the HsGDY of FIG. 6A.
Figure 7B:
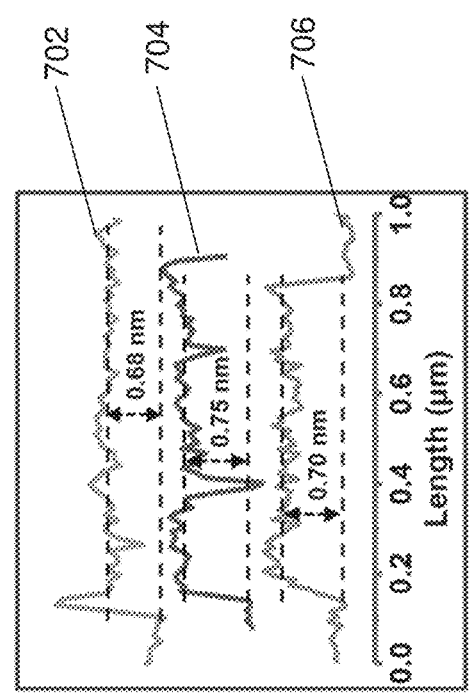
FIG. 7B is a plot showing the height-length profile of the HsGDY of FIG. 6A.

The thickness of the as-prepared HsGDY 602 was examined by atomic force microscopy (AFM). As shown in FIG. 7A, three regions (702, 704, and 706) of the AFM image were selected for height-length profile analysis. As shown in the height-length profile in FIG. 7B, the HsGDY 602 exhibited an ultrathin thickness of 0.68-0.75 nm, which corresponds to a bilayer HsGDY (FIG. 3).

Figure 8:
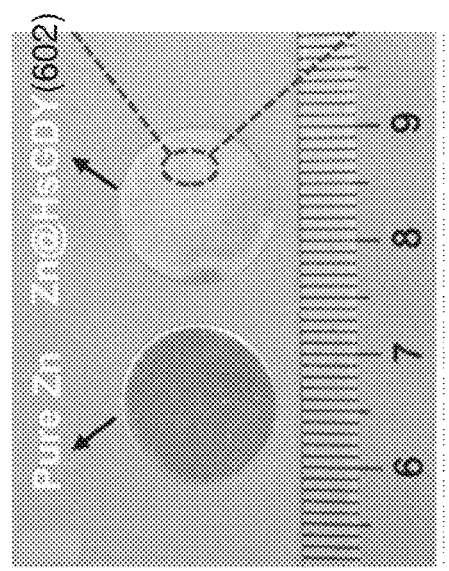
FIG. 8 is an optical image showing the appearance of a zinc substrate before and after a formation of HsGDY thereon.

The color of the Zn substrate may change sharply before and after the HsGDY formation thereon. As shown in FIG. 8, the color of the zinc substrate was changed from argentite to light yellow after the formation of HsGDY 602. As discussed in the earlier part of this disclosure, the HsGDY was a result of the alkynyl-site cross-coupling reaction with the alternate distribution of benzene ring and alkynyl groups as the building units (FIG. 3).

The presence of benzene rings as well as the alkynyl groups of the as-synthesized HsGDY 602 was examined by Raman spectroscopy. In particular, three detection points were selected for examination. As shown in FIG. 9A, all the three detection points displayed the characteristic peaks of benzene ring (1584 $cm^{-1}$), alkynyl (1931, 2188 $cm^{-1}$), and defect (1352 $cm^{-1}$), demonstrating the as-predicted polymerization of TEB monomers on Zn substrate to form HsGDY. In addition, the corresponding Raman mappings as shown in FIGS. 9B and 9C showed that the signals were concentrated on the alkynyl groups and benzene ring, demonstrating the homogeneous distribution of both functional groups along the 2D surface.

Figure 10:
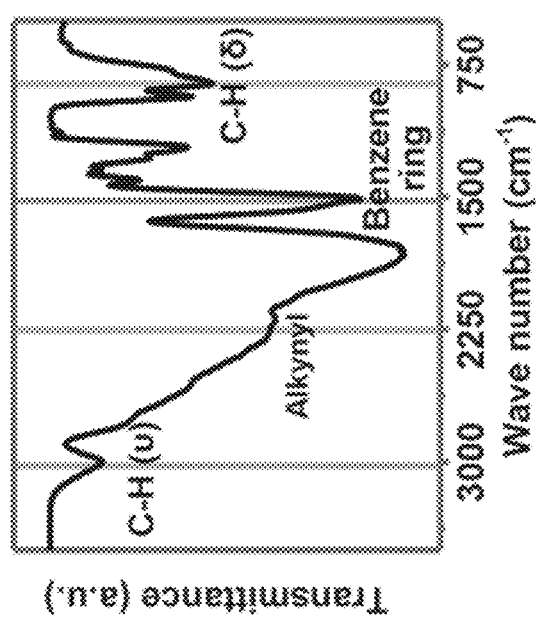
FIG. 10 is a Fourier transformation infrared spectroscopy (FTIR) spectra of the HsGDY of FIG. 8 showing the fingerprint peaks of C—C and C—H bonds.

FTIR spectrum of the HsGDY showed apparent adsorption peaks of both C—C groups (benzene ring 1490-1700 $cm^{-1}$, alkynyl 2191-2450 $cm^{-1}$) and C—H group (stretching vibration 2972-3200 $cm^{-1}$, bending vibration 845-951 $cm^{-1}$) (FIG. 10). In spite of the above spectroscopy analyses, X-ray technologies including XPS and XANES were further utilized to study the fine chemical structure of HsGDY.

The survey XPS spectra exhibited the remarkable presence of C (ca. 280-290 eV) element while the coexistence of Zn element (1020 and 1040 eV) after HsGDY formation on the Zn foil, evidencing the successful synthesis of HsGDY on the Zn substrate once again (FIG. 11A). High-resolution C1s XPS spectrum evidences the dominant presence of benzene ring (C=C, 284.6 eV) and alkynyl (C≡C, 285.4 eV) (FIG. 11B). In addition, trace amount of oxygen (C—O at 288 eV, C=O at 289.6 eV) were detected which may be due to the weak oxidation at the alkynyl site. With higher precision, C K-edge XANES (FIG. 11C) further confirms the HsGDY's chemical environment: C=C bond (benzene ring, 285.1 and 292.9 eV for n and a excitations respectively), C≡C bond (285.6 eV, as magnified in the inset), C—O bond (288.6 eV), C—H bond (290.4 eV).

As mentioned in the earlier part of this disclosure, the synthesis of HsGDY and/or the analogues may suffer from low product yield. This issue may be overcome by the utilization of zinc powder (which has much higher surface area than Zn foil) as the catalytic substrate in the synthesis.

Figure 12A:
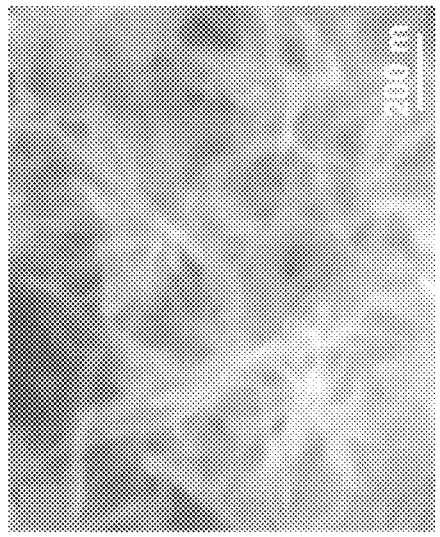
FIG. 12A is a SEM image showing a zinc powder particle with HsGDY synthesized thereon.
Figure 12B:
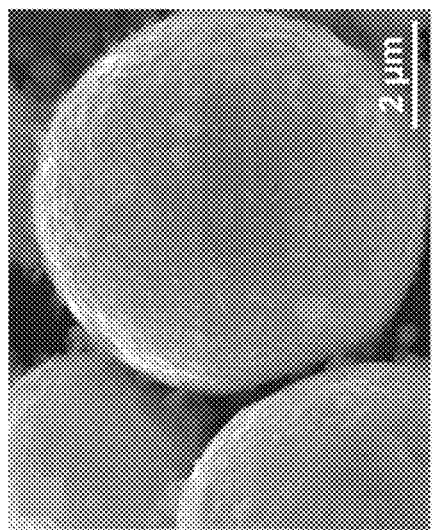
FIG. 12B is a magnified SEM image of FIG. 12A, showing the HsGDY formed on the zinc powder particle surface.
Figure 12C:
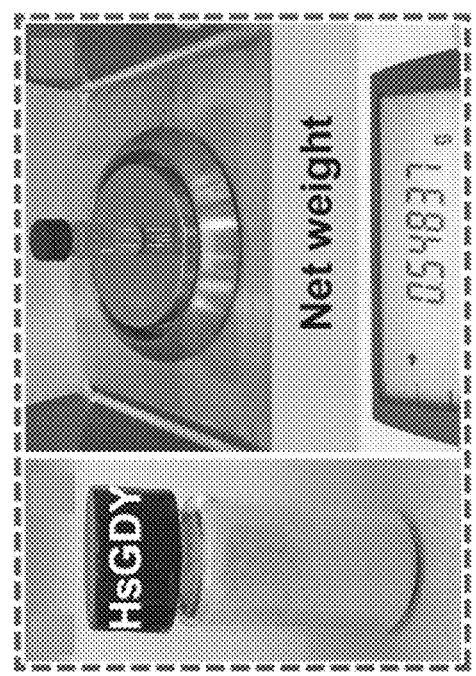
FIG. 12C is an optical image showing an as-synthesized HsGDY from zinc powder in a vial and the net weight of the HsGDY.
Figure 13A:
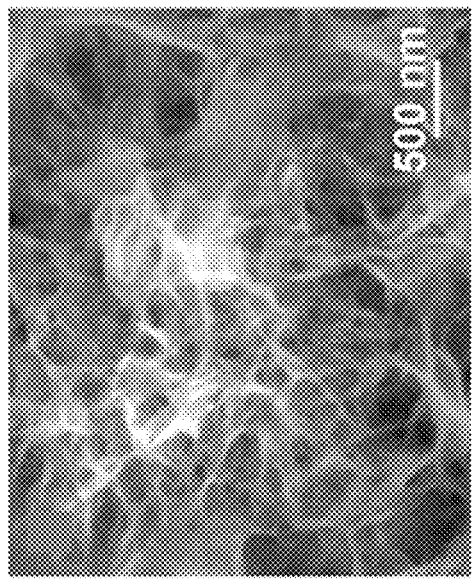
FIG. 13A is a SEM image of the HsGDY of FIG. 12C.
Figure 13B:
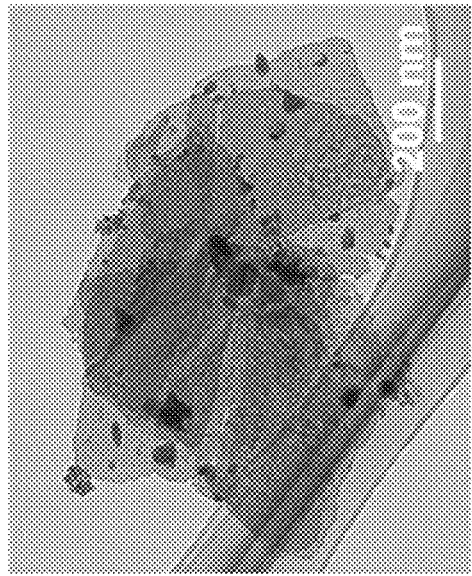
FIG. 13B is a TEM image of the HSGDY of FIG. 12C demonstrating the 2D nanosheet topology thereof.

With the use of zinc powder, the synthesis (i.e. the polymerization of TEB monomers) may proceed on a solid-liquid interface and generate a large amount of HsGDY as observed by the SEM images (FIGS. 12A and 12B). This interface-reaction feature may offer a promising method to tackle the issue of low HsGDY synthetic yield. As shown in FIG. 12C, a scalable amount of HsGDY (0.548 g) was obtained with the use of Zn powder as the catalytic substrate. SEM and TEM analyses confirmed that the HsGDY synthesized on zinc powder possesses similar 2D nanosheet morphology as that prepared on the Zn foil (FIGS. 13A and 13B).

In addition to the capability of providing a scalable amount of HsGDY, the use of zinc powder may also increase the sustainability (i.e. operation lifetime) of the synthetic method. For example, the metallic zinc of the zinc powder was etched away as zinc ion for catalyzing the HsGDY formation; after the catalysis, the zinc ion is electrochemically reduced back to metallic zinc to serve as the catalytic substrate in the next round of synthesis.

Figure 14B:
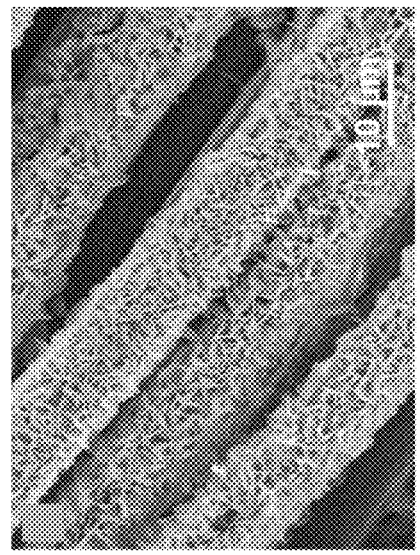
FIG. 14B is a plot of current against time indicating concentration of the metallic ions in the setup of FIG. 14A.

As an example, a three-electrode electrochemical cell has been setup for demonstrating the recycling of metallic zinc during HsGDY synthesis. As shown in FIG. 14A, the etched Zn may be collected using a zinc plate or zinc foil. Alternatively, this recycling process may be conducted using a carbon cloth. As shown in FIG. 14B, electrical current passing through the electrodes and $ZnCl_2$ solution during operation was found to be substantially constant over a period of time, suggesting that the concentration of Zn ions in the electrolytic solution and the amount of metallic Zn on the zinc plate remain similar during the cycle synthetic process. When the Zn plate was replaced by a piece of carbon cloth, similar current profile was observed, which further suggests that the recycling of Zn/Zn ions during the catalytic synthetic process (FIG. 14B).

Figure 14D:
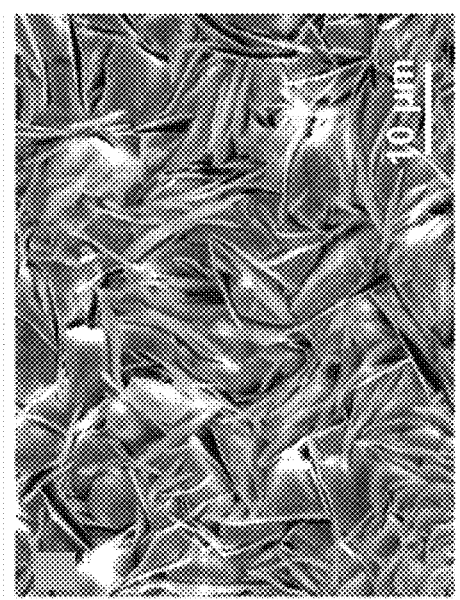
FIG. 14D is a SEM image of metallic zinc redeposited on a carbon cloth from an etching solution through an electrochemical reduction of zinc ions in the etching solution.
Figure 14A:
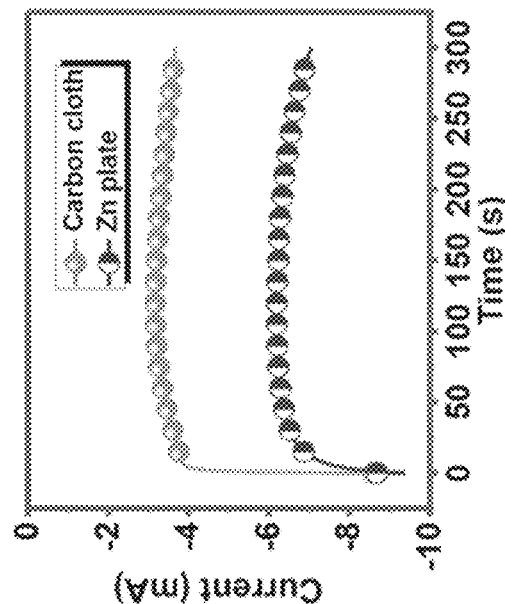
FIG. 14A is an optical image showing an example setup for reducing $Zn^{2+}$ into metallic Zn using a piece of Zn plate substrate in accordance with an embodiment of the present invention.
Figure 14C:
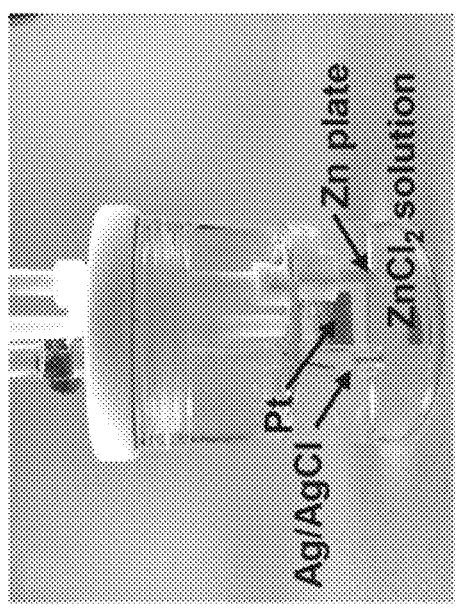
FIG. 14C is a SEM image of metallic zinc redeposited on a zinc plate from an etching solution through an electrochemical reduction of zinc ions in the etching solution.

The recycling of Zn/Zn ions during the synthesis is further evidenced by the uniform distribution of metallic zinc on the surface of the zinc plate and the carbon cloth after the synthesis, as shown in the SEM images of FIGS. 14C and 14D.

Figure 15A:
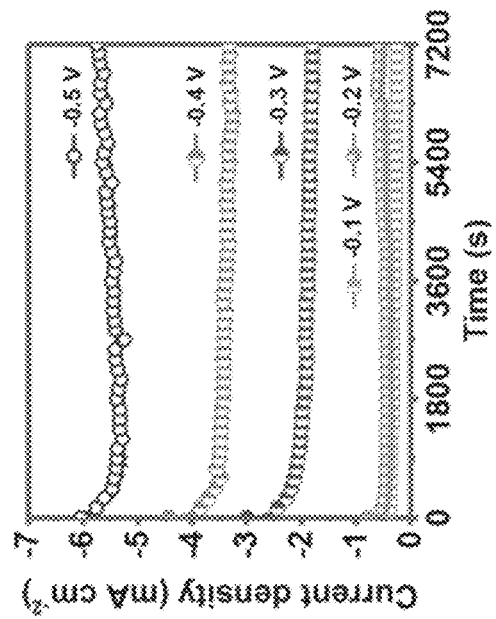
FIG. 15A is a plot of current density against potential from linear sweep voltammetric (LSV) examination showing the potential range for nitrogen reduction reaction (NRR) of the HSGDY of FIG. 12C.

The HsGDY of the present disclosure may be used as a metal-free catalyst for nitrogen fixation. The nitrogen fixation capability of the HsGDY was evaluated in a $N_2$-saturated 0.05 M $H_2SO_4$ electrolyte within an H-shape configuration. Initially, linear sweep voltammetric (LSV) examination was carried out in the electrolytes saturated with $N_2$ and Ar respectively to preliminarily evaluate the nitrogen reduction reaction (NRR) catalytic activity of HsGDY (FIG. 15A). Apparently, the response current density in $N_2$ is larger than that in Ar especially within the potential range from −0.2 to −0.4 V, implying extra contribution from NRR process.

Figure 15B:
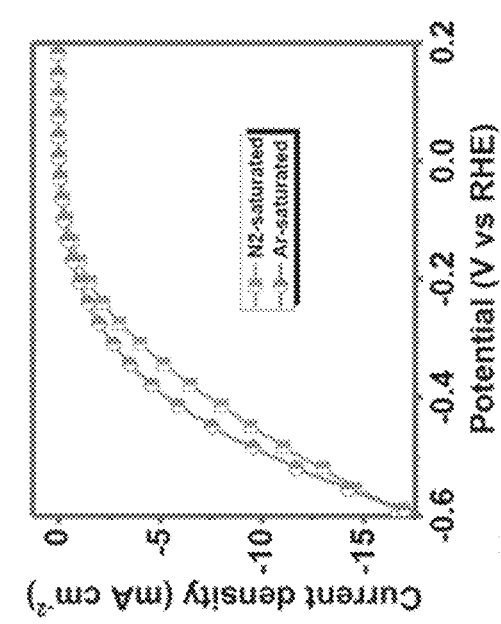
FIG. 15B is a plot of current density against time showing the current-time profiles obtained at various potentials (from −0.1 to −0.5 V) for calculating the whole charge quantity consumed.
Figure 15C:
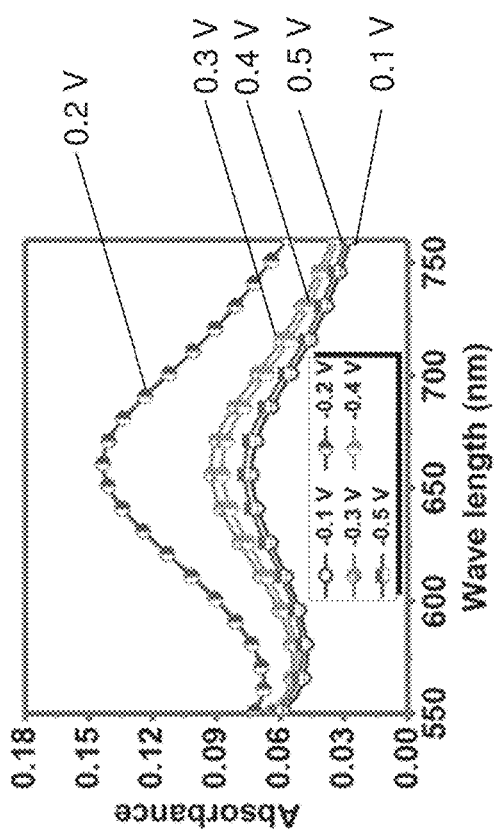
FIG. 15C is UV-Vis absorption spectra showing the absorption profiles of electrolytes after $NH_3$ formation at different potentials.

Chronoamperometry curves were then recorded for 7200 s at different potentials ranging from −0.1 to −0.5 V, which demonstrate the desirable stability of HsGDY catalyst (FIG. 15B). The electrolytes containing $(NH_4)_2SO_4$ (originates from the reaction between $NH_3$ and $H_2SO_4$) after the electrochemical $N_2$ fixation were quantitatively detected by UV-Vis absorption spectroscopy (FIG. 15C).

Figure 16A:
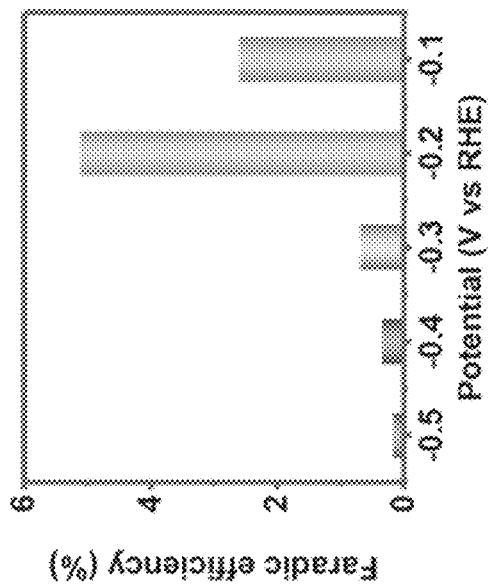
FIG. 16A is a bar chart showing the calculated yield rate of $NH_3$ at various potentials.
Figure 16B:
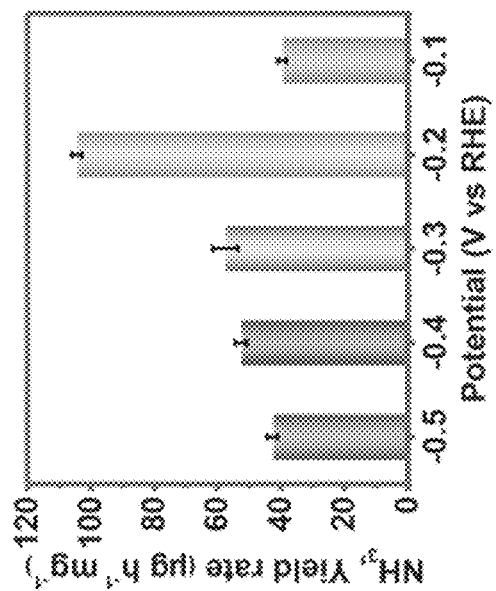
FIG. 16B is a bar chart showing the faradic efficiency (FE) corresponding to the $NH_3$ yield rate of FIG. 15A.

Based on the data obtained from the UV-Vis absorption spectra, the $NH_3$ yield rates of HsGDY at different potentials were determined. An absorbance-concentration linear relation was first calibrated using standard $(NH_4)_2SO_4$ solution. Then, the $NH_3$ yield rate, a crucial evaluation indicator of NRR capability, was calculated based on the equation obtained from the plot of the absorbance-concentration linear relation. As shown in FIG. 16A, the $NH_3$ yield rate of HsGDY was found to reach the highest value (103 µg h$^{-1}$ mg$^{-1}_{cat.}$) at −0.2 V, which surpasses the majority of reported NRR catalysts such as carbon-based catalysts (2.1-55 µg h$^{-1}$ mg$^{-1}_{cat.}$), noble metal and single-atom catalysts (1.6-34.8 µg h$^{-1}$ mg$^{-1}_{cat.}$), etc. Correspondingly, the faradic efficiency (FE, %) of $NH_3$ production was also found to achieve the largest value at −0.2 V, which may be due to the synergistic effect of favored NRR and suppressed water splitting (FIG. 16B).

Figure 16C:
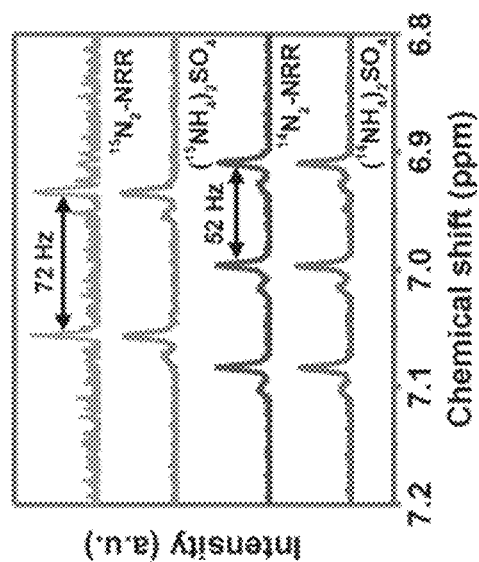
FIG. 16C is an $^1H$ nuclear magnetic resonance (NMR) spectra of an electrolyte saturated with $^{15}N_2$ after NRR in comparison with a standard ($^{15}NH_4)_2SO_4$ solution.

Blank experiments of pristine carbon cloth at −0.2 V and HsGDY catalyst at open-circuit voltage (OCV) verify that the detected $NH_3$ originates from the reduction of the bubbling $N_2$ by HsGDY. The hydrazine byproduct was scarcely detected in the reacted electrolyte at the whole voltage range, which evidences the high selectivity of HsGDY. Besides, the $^1H$ NMR spectra successfully detected a doublet coupling (~72 Hz) for $^{15}NH^4$ in the electrolyte fed by $^{15}N_2$ gas after NRR, confirming the reduction of $N_2$ into $NH_3$ catalyzed by HsGDY (FIG. 16C).

DFT computation was applied to determine the NRR active site in HsGDY. According to the calculations, pure HsGDY can only adsorb $N_2$ molecule physically, evidenced by the long interaction distance, which is around 3.34 Å. Based on the C K-edge XANES and C1s XPS investigations, oxygen dopants were introduced into the pure HsGDY to explain the excellent NRR capability of the HsGDY with four different means.

Figure 17:
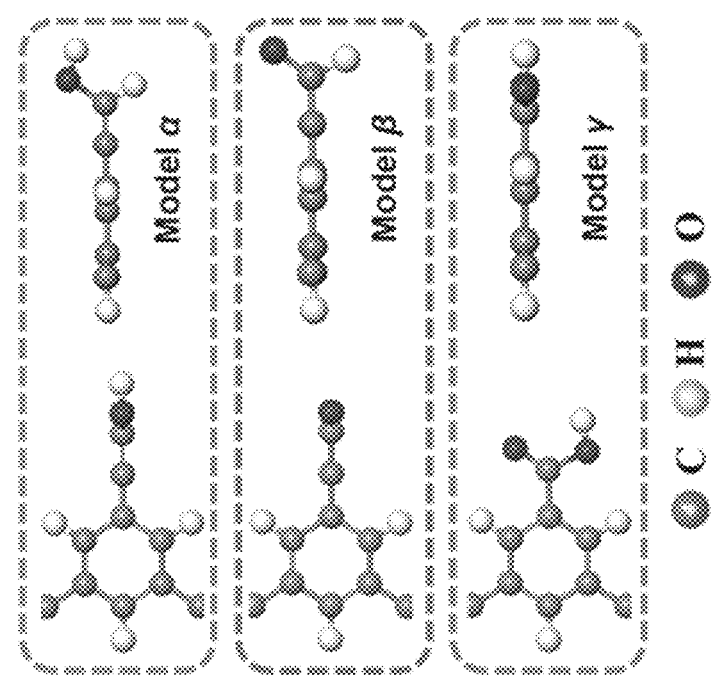
FIG. 17 is a schematic diagram showing the localized chemical structures of HsGDY doped with different types of oxygen atom.

As shown in FIG. 17, the model with O atom bonded to the out-side alkynyl C atom (away from benzene ring) was defined as α-type, where the O dopant was presented as hydroxyl with a carbon-oxygen bond length of about 1.39 Å. In model β, the oxygen dopant was presented as an aldehyde group, with a shorter carbon-oxygen bond length of about 1.28 Å. In model γ, two O atoms were introduced to form a carboxyl group with carbon-oxygen bond lengths of 1.23 Å (C=O) and 1.36 Å (C—O). Finally, in model δ, the O atom was bonded to the in-side alkynyl C atom (near the benzene ring), where the carbon-oxygen bond exhibits C=O property (length: 1.26 Å).

Figure 18:
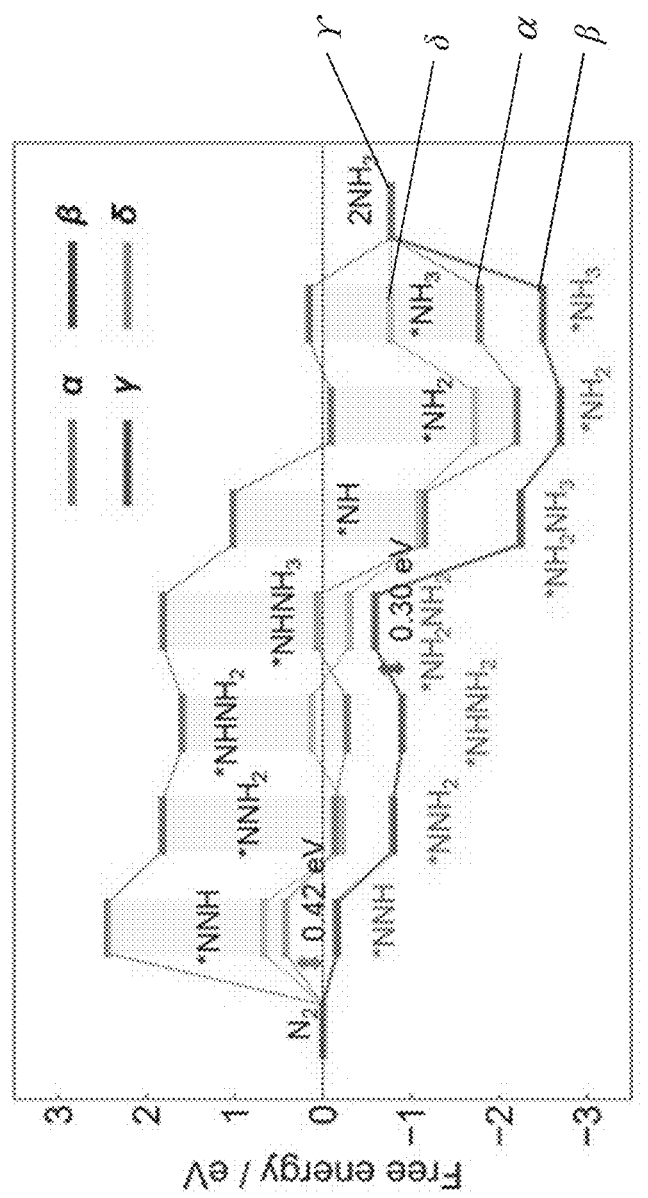
FIG. 18 is an energy diagram showing the free energy profiles along the reaction route for different HsGDY O-doped models.

Referring to FIG. 18, there is provided a map that can screen out the optimal O-doped model and determine the rate-control step during the whole NRR process. In this map, the active site(s) of different HsGDY models are represented by asterisk (*). As shown in FIG. 18, the uphill energy barriers of models α, γ, and δ (more than 0.42 eV) were much larger than that of the model β, where the largest uphill energy barrier of which was only 0.30 eV. Accordingly, model 3 shows the best catalytic performance toward NRR among the four models.

Figure 19:
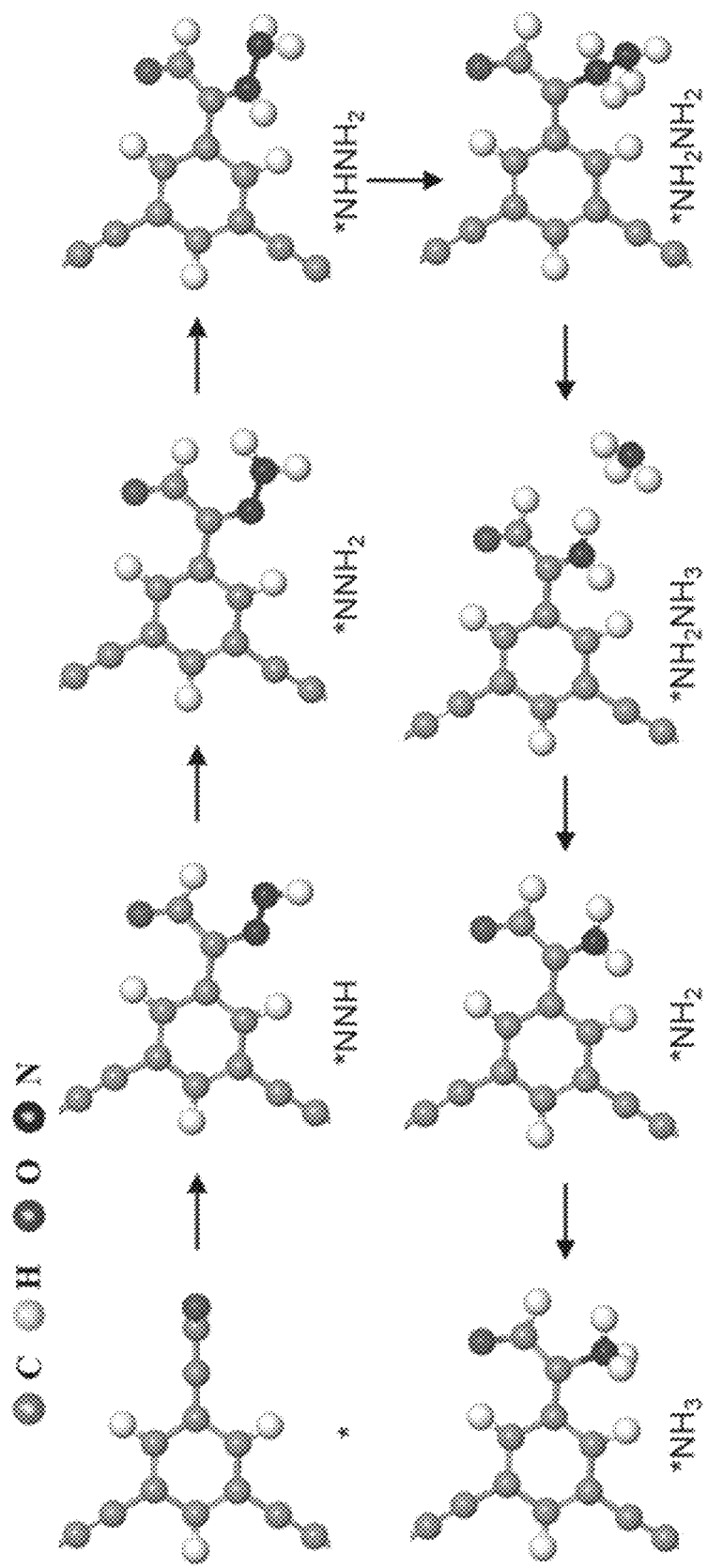
FIG. 19 is a schematic diagram illustrating the localized reaction intermediate configurations of the HsGDY model β upon catalyzing adsorption, hydrogenation, and splitting of $N_2$ in a NRR process.

The active site in model β is determined to be the septal C atom (alkynyl carbon originally) between carbon hexagonal ring and the aldehyde group, which has positive charge distributions and a large spin density (0.56µ$_B$) due to the adjacent aldehyde group. In particular, model β favors the formation of *$NH_2NH_2$ from *$NHNH_2$, which is distinct from other models (FIG. 19). Thus, the outstanding NRR performance of HsGDY of the present disclosure may be ascribed to the alkynyl carbon atom itself (rather than the O dopant) between the carbon hexagonal ring and the aldehyde group.

The method of the present invention is advantageous graphdiyne-based material with high crystallinity may be synthesized. In particular, the method of the present invention can effectively synthesize a graphdiyne-based material with at least one two-dimensional crystalline layer thereof. In addition, with the use of the presently claimed method, the graphdiyne-based material may be produced in a scalable amount such as in an amount of at least 0.5 g.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method of preparing a graphdiyne-based material comprising the steps of:
    disposing an alkynye-based monomer on a substrate;
    maintaining a planar structure of each of a plurality of molecules of the monomer on a surface of the substrate; and
    initiating polymerization of the monomer on the substrate to synthesize a two-dimensional crystalline layer of the graphdiyne-based material on the substrate.

2. The method of preparing a graphdiyne-based material according to claim 1, wherein the substrate is arranged to reduce chemisorption between each of the plurality of molecules of the monomer and the surface of the substrate.

3. The method of preparing a graphdiyne-based material according to claim 2, wherein the reduction of chemisorption causes an increase in monomer-substrate distance, thereby preventing configuration distortion of each of the plurality of molecules of the monomer.

4. The method of preparing a graphdiyne-based material according to claim 1, wherein the alkynye-based monomer comprising a structure of Formula (I):

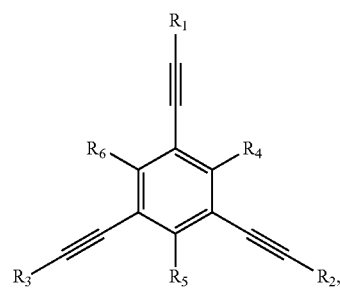

Formula (I)

wherein $R_1$-$R_6$ are independently selected from hydrogen, a trimethylsilyl group, or a halogen.

5. The method of preparing a graphdiyne-based material according to claim 1, wherein the alkynye-based monomer including the structure of Formula (I), and wherein $R_1$-$R_3$ are identical and being H, $SiMe_3$, Cl, Br, or I; and wherein $R_4$-$R_6$ are identical and being H, C≡$CSiMe_3$, Cl, Br, or I.

6. The method of preparing a graphdiyne-based material according to claim 1, wherein the alkynye-based monomer including the structure of Formula (I), and wherein $R_1$-$R_6$ are identical and being H.

7. The method of preparing a graphdiyne-based material according to claim 1, further comprising the step of disposing a polymerization catalyst on the substrate, prior to the step of disposing the alkynye-based monomer on the substrate.

8. The method of preparing a graphdiyne-based material according to claim 7, wherein the step of disposing a polymerization catalyst including the step of dissolving the polymerization catalyst in a solvent mixture.

9. The method of preparing a graphdiyne-based material according to claim 7, wherein the polymerization catalyst includes $PdCl_2(PPh_3)_2$ and CuI.

10. The method of preparing a graphdiyne-based material according to claim 8, wherein the solvent mixture includes tetrahydrofuran and trimethylamine at a volume ratio of 1:1.

11. The method of preparing a graphdiyne-based material according to claim 1, wherein the substrate is a zinc-based material.

12. The method of preparing a graphdiyne-based material according to claim 11, wherein the zinc-based material includes zinc plate and zinc powder.

* * * * *